SOLID STATE IMAGE SENSOR PANEL

Filed Dec. 30, 1965 10 Sheets-Sheet 1

INVENTOR.
PAUL K. WEIMER
BY
Glenn H. Bruestle
Attorney

INVENTOR.
PAUL K. WEIMER
BY
Glenn H. Bruestle
ATTORNEY

Jan. 6, 1970 P. K. WEIMER 3,488,508

SOLID STATE IMAGE SENSOR PANEL

Filed Dec. 30, 1965 10 Sheets-Sheet 3

INVENTOR.
PAUL K. WEIMER
BY
Glenn H. Bruestle
Attorney

Jan. 6, 1970 P. K. WEIMER 3,488,508

SOLID STATE IMAGE SENSOR PANEL

Filed Dec. 30, 1965 10 Sheets-Sheet 4

INVENTOR.

PAUL K. WEIMER

BY

Glenn H. Bruestle

Attorney

INVENTOR.
PAUL K. WEIMER
BY
[signature]
ATTORNEY

SOLID STATE IMAGE SENSOR PANEL

Filed Dec. 30, 1965 10 Sheets-Sheet 6

INVENTOR.
PAUL K. WEIMER
BY
[signature]
ATTORNEY

Jan. 6, 1970 P. K. WEIMER 3,488,508

SOLID STATE IMAGE SENSOR PANEL

Filed Dec. 30, 1965 10 Sheets-Sheet 7

INVENTOR.
PAUL K. WEIMER
BY
Glenn H. Bruestle
Attorney

SOLID STATE IMAGE SENSOR PANEL

Filed Dec. 30, 1965

INVENTOR.
PAUL K. WEIMER
BY
Glenn H. Bruestle
Attorney

Jan. 6, 1970 P. K. WEIMER 3,488,508

SOLID STATE IMAGE SENSOR PANEL

Filed Dec. 30, 1965 10 Sheets-Sheet 9

INVENTOR.

PAUL K. WEIMER

BY

Glenn H. Bruestle

Attorney

Jan. 6, 1970 P. K. WEIMER 3,488,508

SOLID STATE IMAGE SENSOR PANEL

Filed Dec. 30, 1965 10 Sheets-Sheet 10

Inventor:
PAUL K. WEIMER
BY [signature]
Attorney

United States Patent Office 3,488,508

Patented Jan. 6, 1970

3,488,508

SOLID STATE IMAGE SENSOR PANEL

Paul K. Weimer, Princeton, N.J., assignor to RCA Corporation, a corporation of Delaware Filed Dec. 30, 1965, Ser. No. 517,768

Int. Cl. H01j *39/12*

U.S. Cl. 250—211 13 Claims

ABSTRACT OF THE DISCLOSURE

A solid state image sensor panel includes a plurality of row conductors and a plurality of column conductors insulated from the row conductors. At each crossover point between the row conductors and the column conductors, there is a conducting element which includes a photoconductor and at least one solid state switching device. The photoconductor has an inherent capacitance and its resistance and capacitance are such that they define a time constant greater than the time between input signal pulses.

This invention relates to an image sensor panel, and in particular, to a solid state image sensor panel for providing an output signal corresponding to a spatial analysis of an image to be "read" or scanned.

The solid state image sensor panel described herein is particularly suitable (1) for the transmission of images via video signal and (2) for reading a medium having information stored therein, e.g. a punched card or a tape.

In the electrical transmission of images for remote viewing, vidicon cameras have been developed which provide a time varying video signal corresponding to a spatial analysis of the image to be transmitted. For most applications, as in conventional television, the entire image must be scanned many times per second. Special camera tubes are presently required which use an electron beam for scanning the image. Such tubes offer serious limitations for certain applications. For example, the image quality (including sensitivity, signal to noise ratio, resolution, geometric fidelity and smearing of images due to motion) is limited by the camera tube gun and the auxiliary equipment used to deflect and focus the beam. Further, the space, power, and weight requirements of conventional television cameras, even in miniaturized models, prevent their effective use in many applications.

In the reading of storage mediums, for example punched cards, various types of image sensor devices are available which detect the presence of preforations at particular locations on the card by utilizing sensing pins, conductive brushes, or the like, to penetrate the perforations and actuate an electrical detecting circuit. Such apparatus not only requires complex mechanisms to move the brushes to and from the cards but are also subject to erroneous readings due to pitting of the brushes, the accumulation of dirt thereon and the like. Also, mark-sensing reading apparatus similarly requires relatively complex and expensive reading circuitry.

According, it is an object of this invention to provide a new and improved image sensor panel.

It is another object of this invention to provide a more compact and lighter image sensor panel than heretofore found in the prior art.

Yet, another object of this invention is to provide a solid state image sensor panel having an output current which more accurately depicts a scanned image.

The improved image sensor panel described herein is characterized in that in operation scan pulses are applied to both a first and a second group of conductors, respectively, causing only one of a multiplicity of solid state switch devices electrically coupled to the conductors within the panel to be conducting at any given time. The solid state switch devices which are not conducting act as open switches. The output current for a conducting element, which includes a solid state switch and a photoconductor, is proportional to the resistivity of the photoconductor. The resistivity of each photoconductor is proportional to the amount of light which strikes it. If the shadow of an image is projected onto the sensor panel, the output current from conducting elements located in the dark areas of the panel is less than the output current from conducting elements located in the light areas of the panel. Consequently, the total output current "reproduces" the scanned image.

Figure 3:
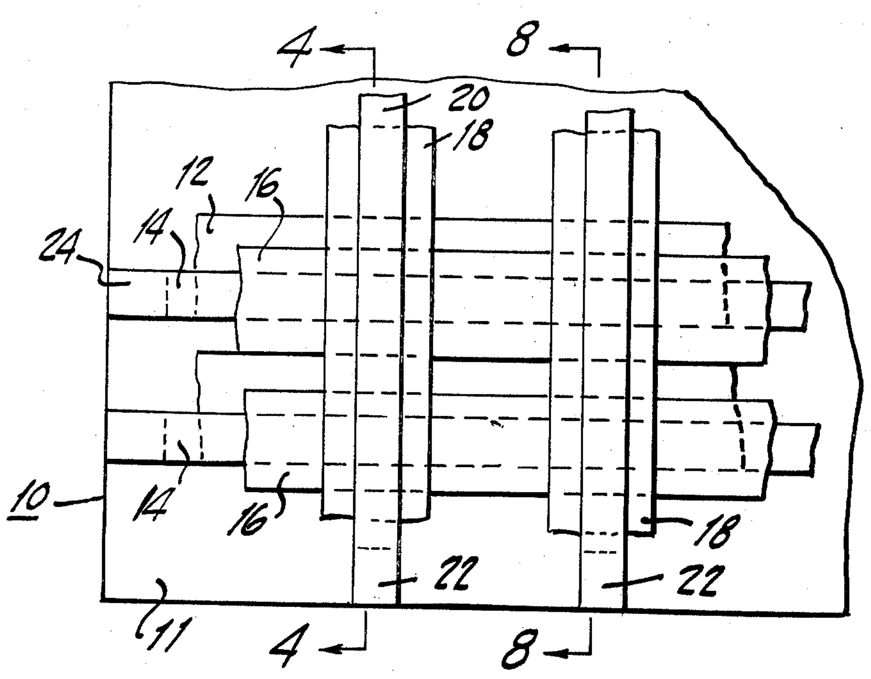
FIGURE 3 is a plan view of a portion of an image sensor panel which illustrates an embodiment of this invention.
Figures 7A, 7B, 7C:
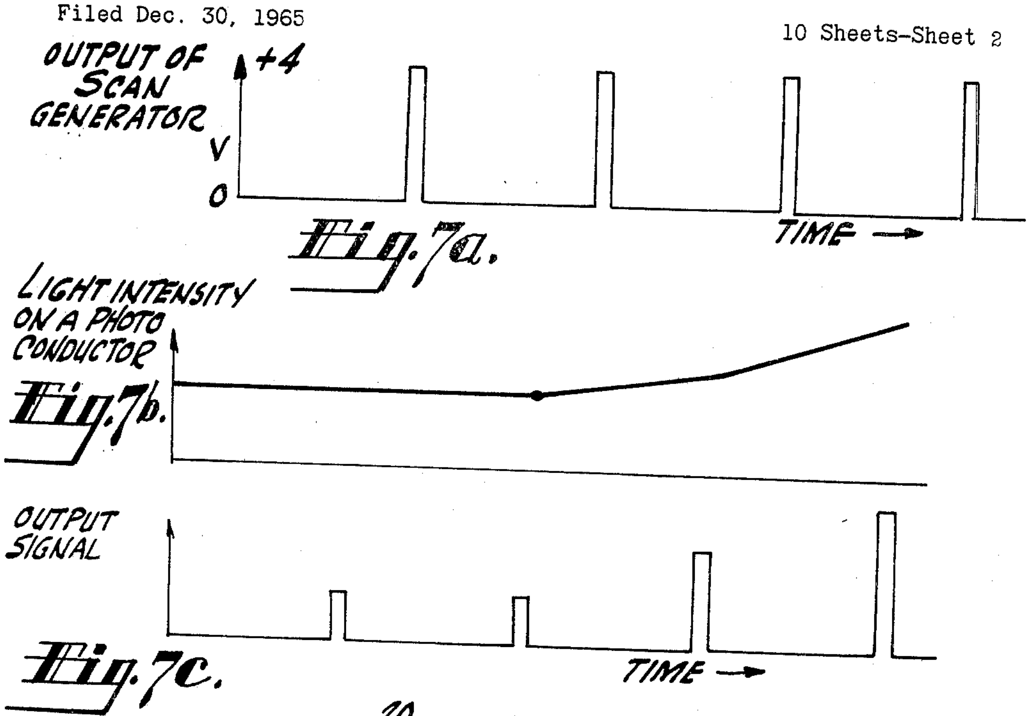
Figure 4:
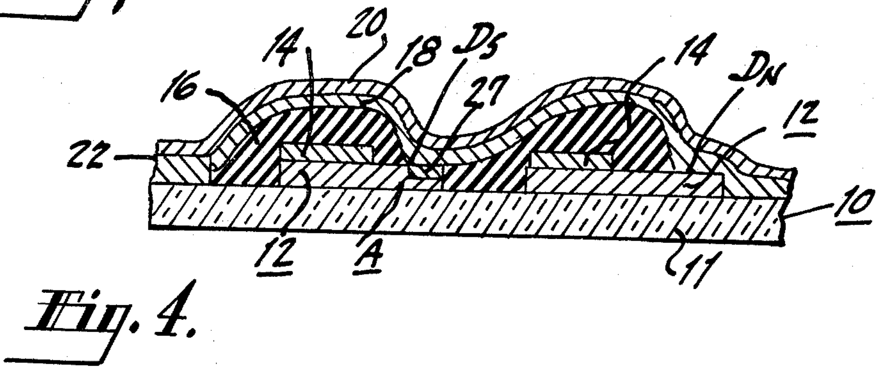
FIGURE 4 is a cross-sectional view taken along line 4—4 of FIGURE 3.
Figure 8:
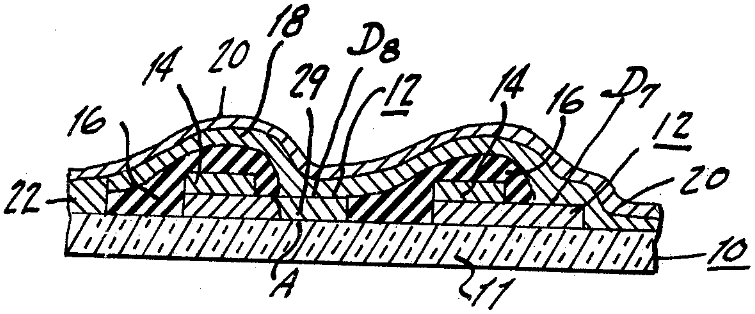
Figure 9:
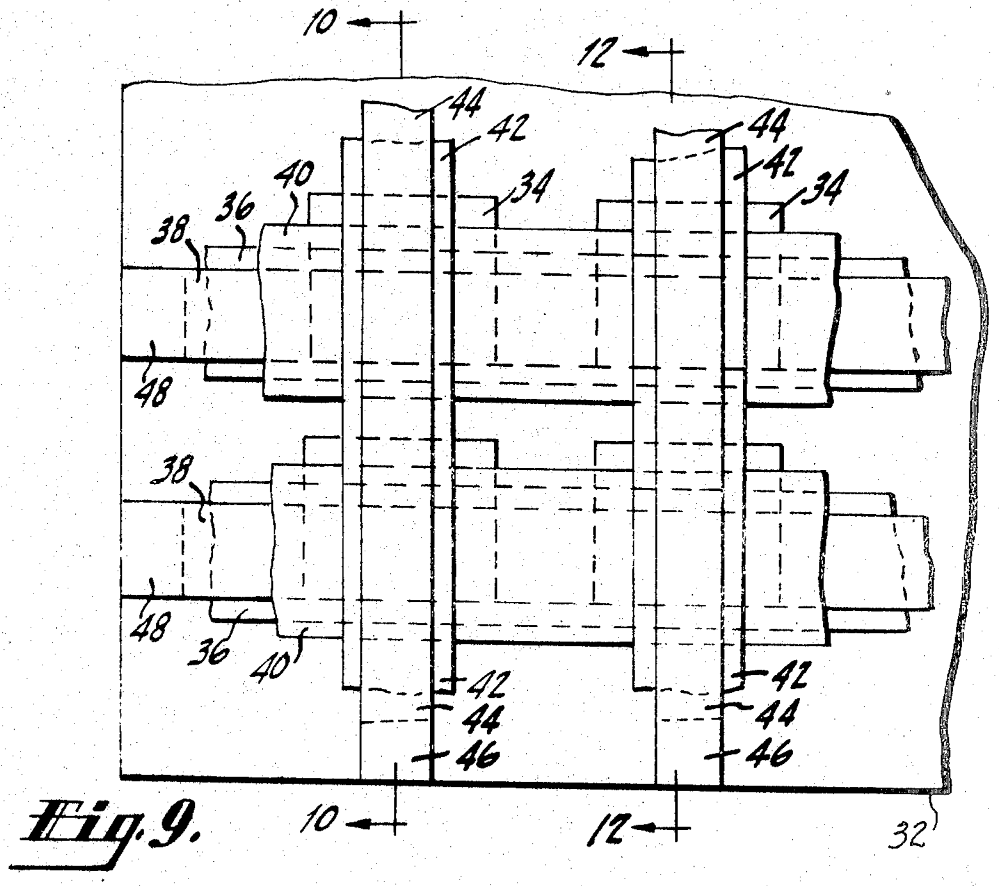
Figure 10:
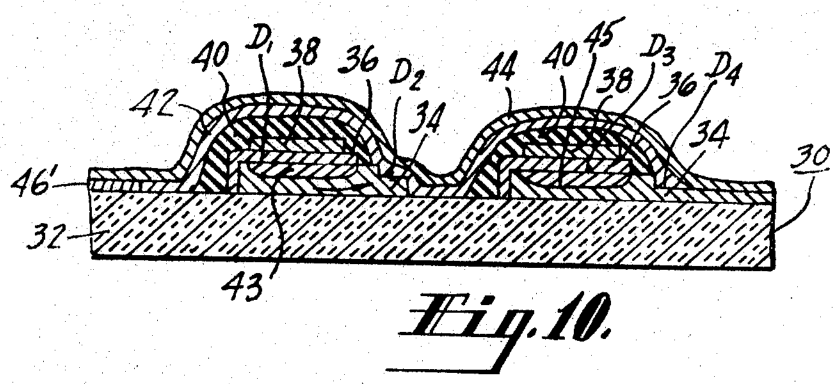
Figure 11:
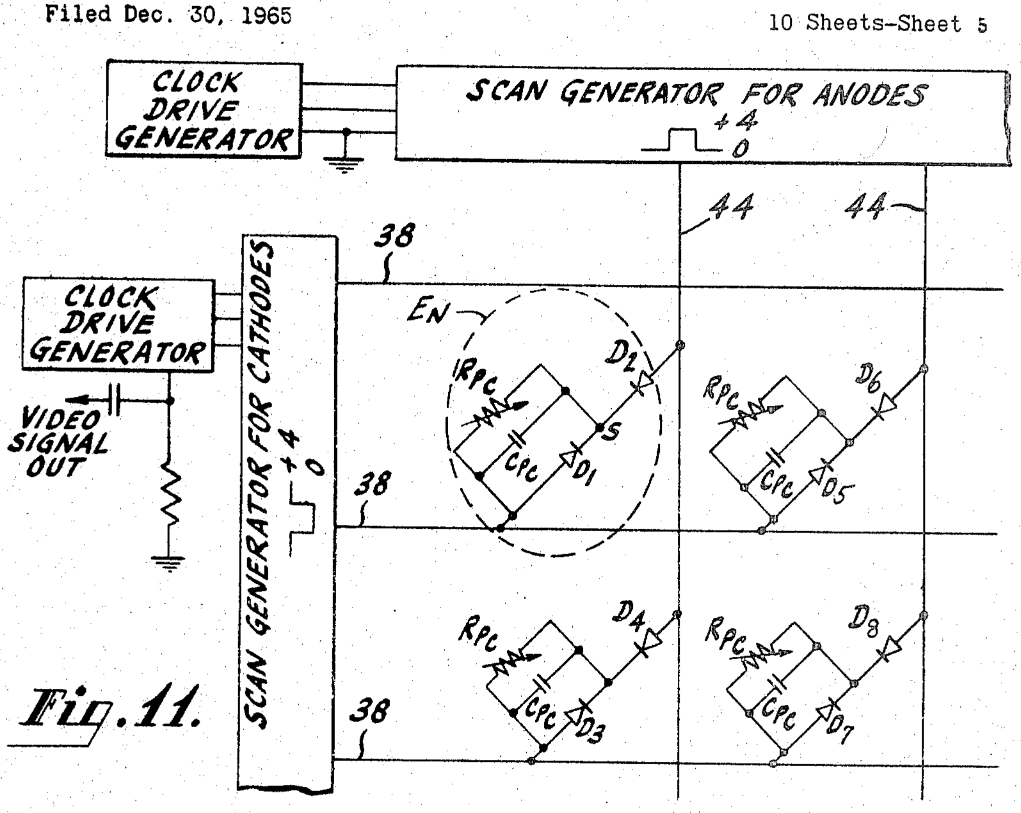
Figure 12:
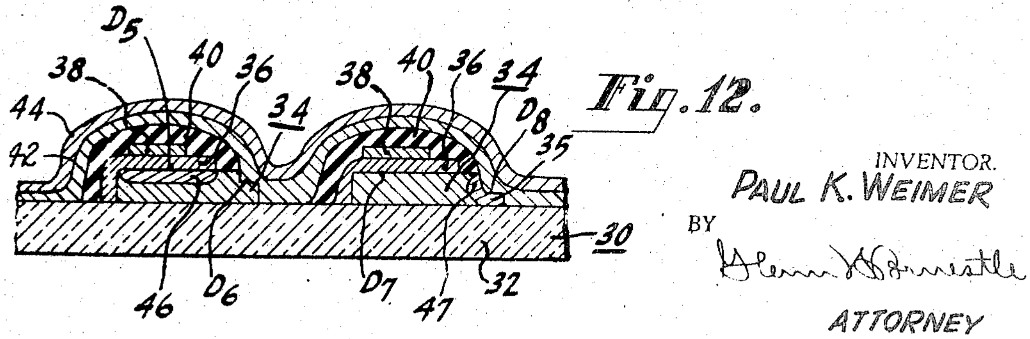
Figure 13A:
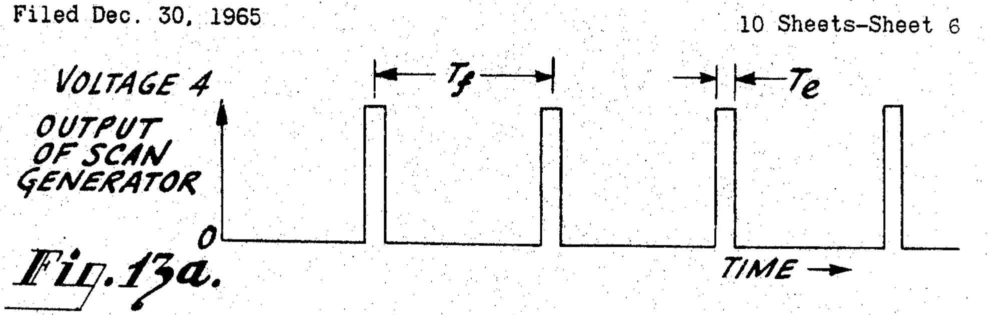
Figure 13B:
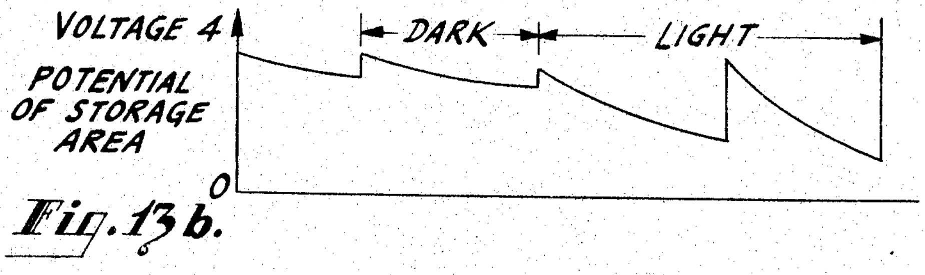
Figure 13C:
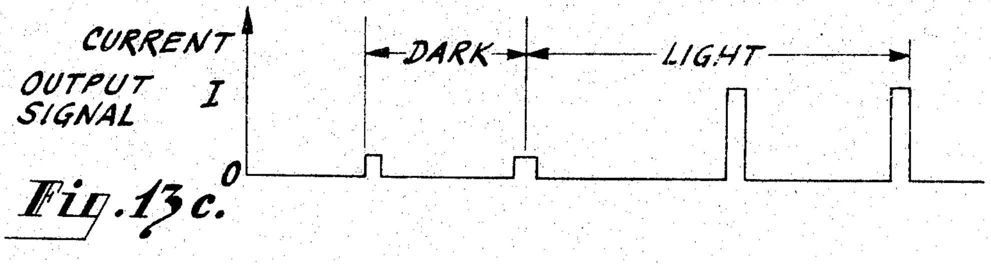
Figure 14:
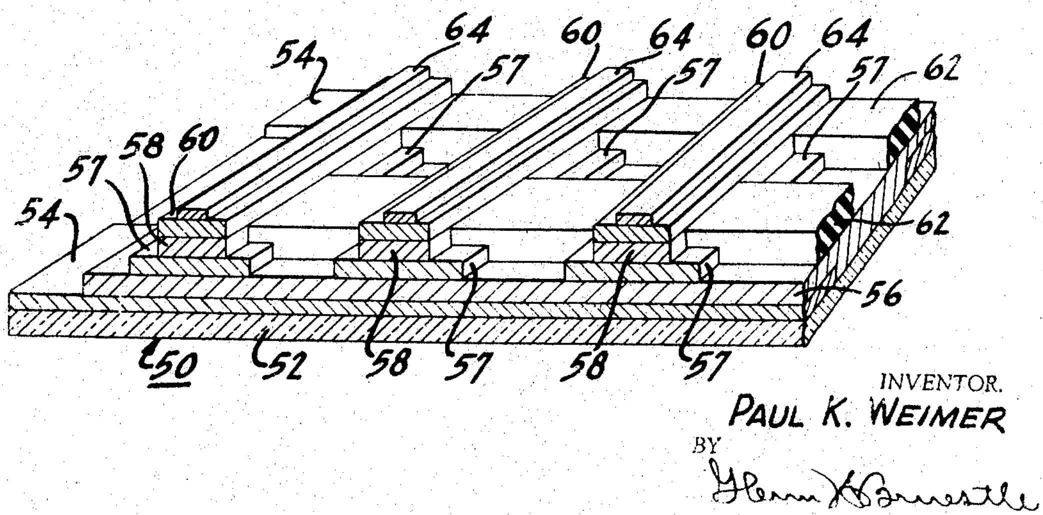
Figure 15:
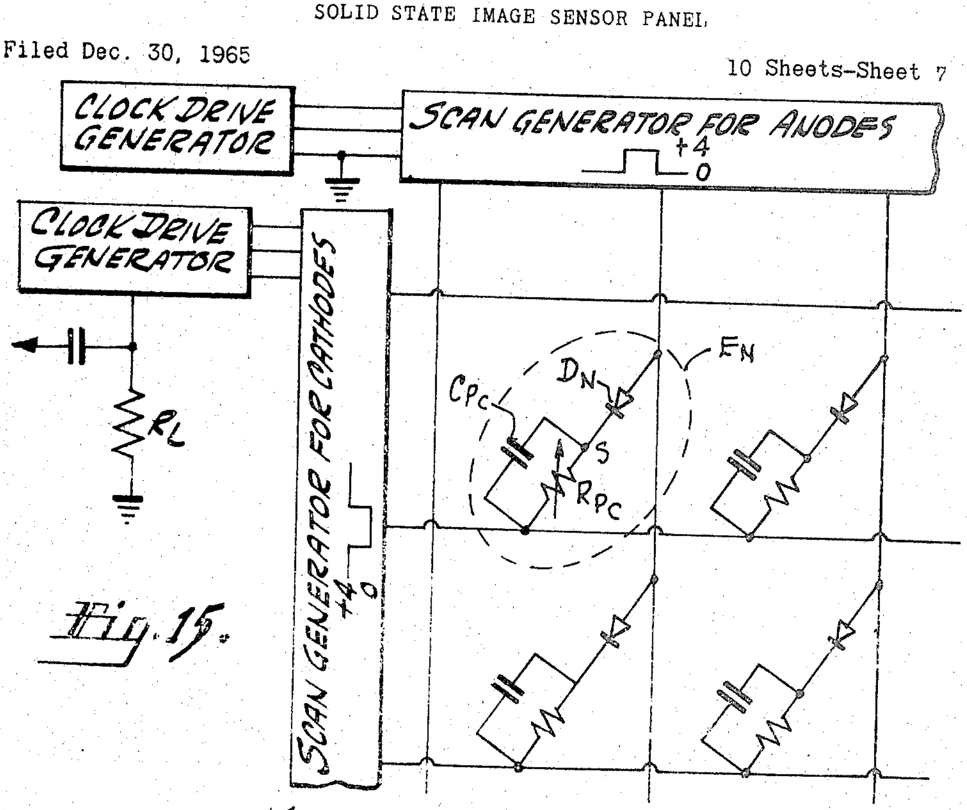
Figure 16:
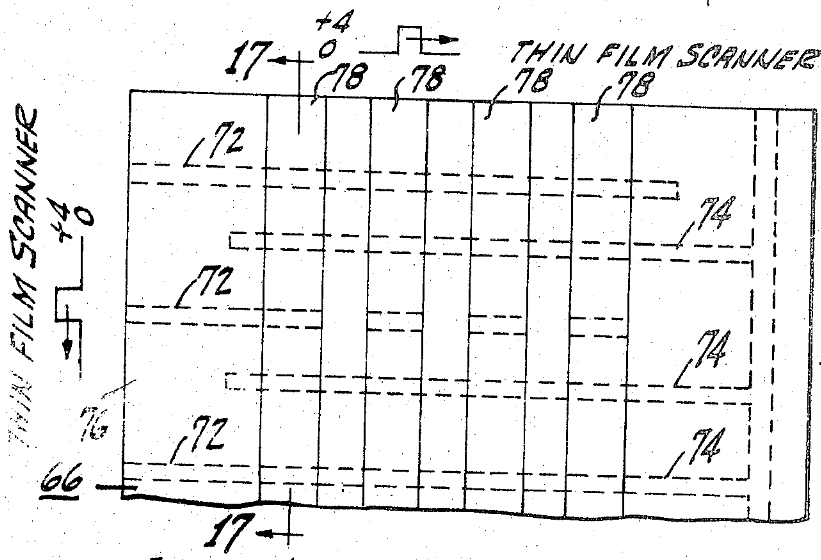
Figure 17:
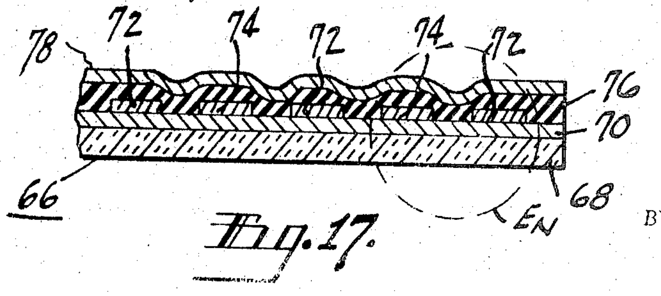
Figure 18:
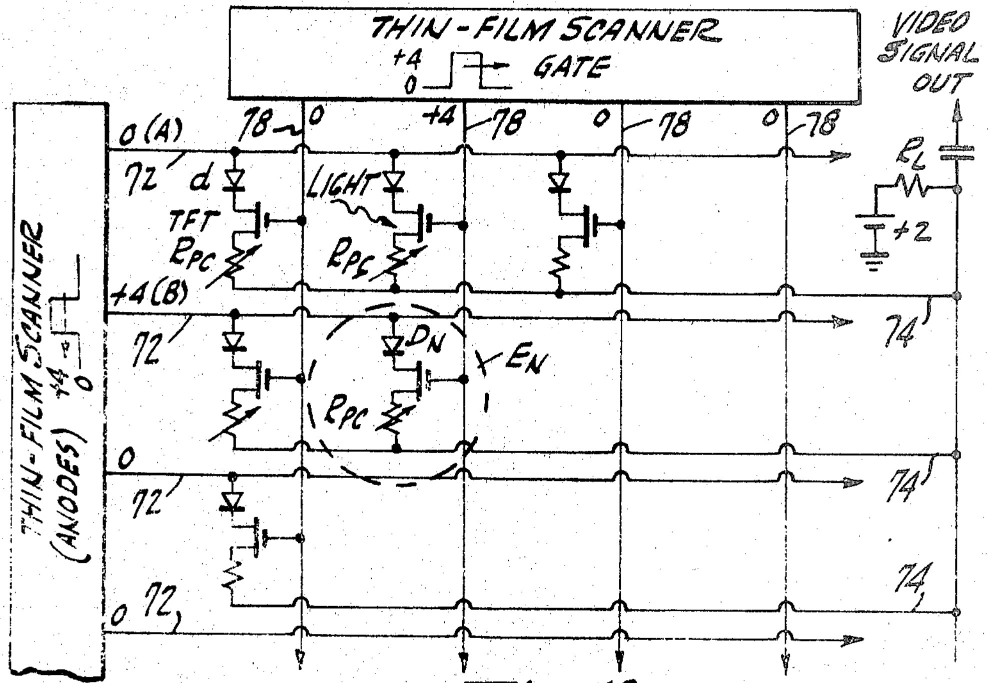
Figure 24:
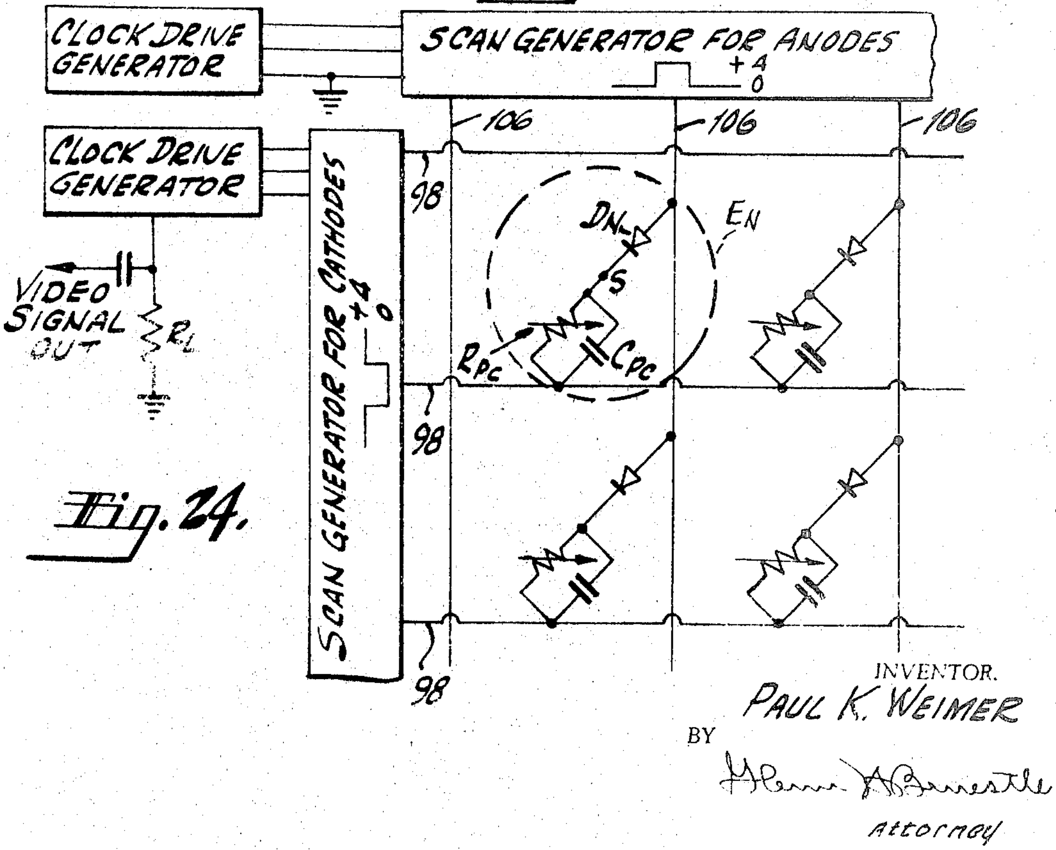
Figure 19:
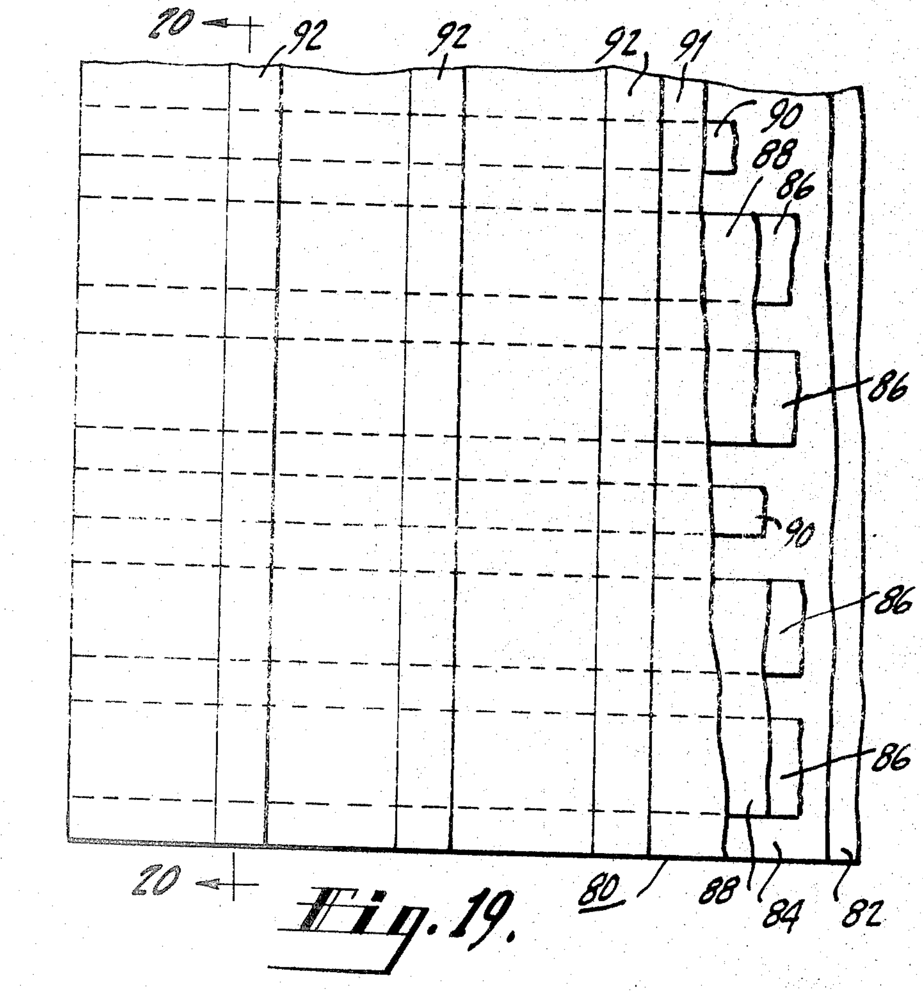
Figure 20:
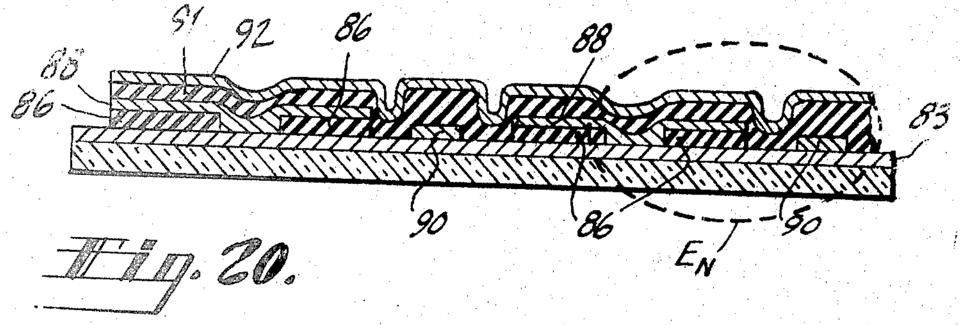
Figures 21, 22, 23:
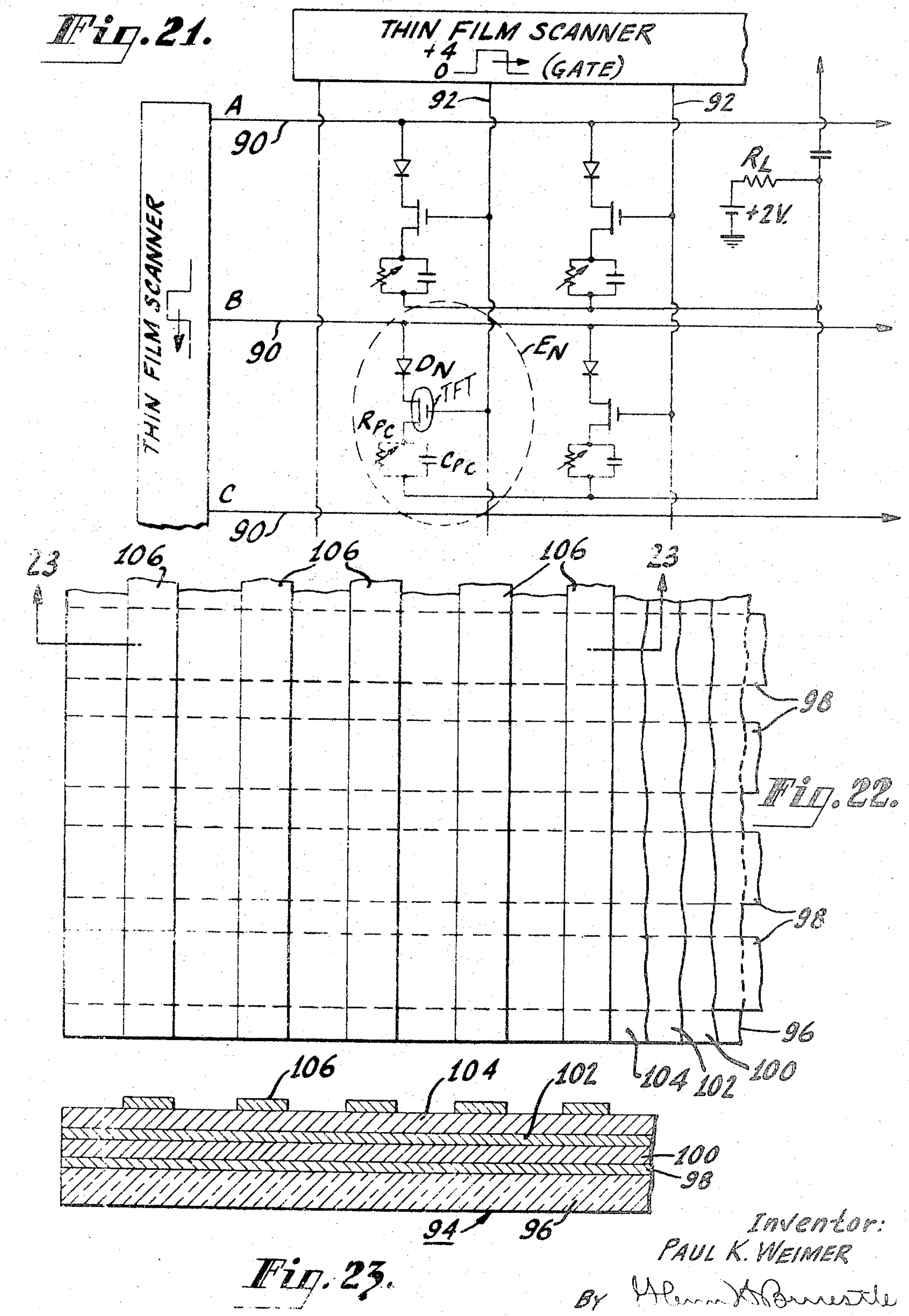

FIGURES 7*a*, 7*b*, and 7*c* are waveform diagrams illustrating the electrical characteristics of the image sensor panel of FIGURES 3 and 4;

FIGURE 8 is a cross-sectional view taken along line 8—8 of FIGURE 3 and illustrates the formation of a depletion region within a photoconductor region at reverse bias;

FIGURE 9 is a plan view of a portion of an image sensor panel which illustrates another embodiment of this invention;

FIGURE 10 is a cross-sectional view taken along line 10—10 of FIGURE 9;

FIGURE 11 is a schematic circuit diagram of the image sensor panel illustrated in FIGS. 9 and 10 connected to scan pulse circuits;

FIGURE 12 is a cross-sectional view taken along line 12—12 of FIGURE 9;

FIGURES 13*a*, 13*b*, and 13*c* are waveform diagrams illustrating electrical characteristics of the image sensor panel of FIGURE 9;

FIGURE 14 is a cross-sectional perspective view of a solid-state image sensor panel which illustrates another embodiment of this invention;

FIGURE 15 is the equivalent circuit diagram for the panel illustrated in FIGURE 14;

FIGURE 16 is a plan view of a portion of a solid-state image sensor panel which illustrates another embodiment of this invention;

FIGURE 17 is a cross-sectional view taken along line 17—17 of FIGURE 16;

FIGURE 18 is the equivalent circuit diagram for the panel illustrated in FIGURES 16 and 17;

FIGURE 19 is a plan view of a portion of a solid-state image sensor panel which illustrates another embodiment of this invention;

FIGURE 20 is a cross-sectional view taken along line 20—20 of FIGURE 19;

FIGURE 21 is an equivalent circuit diagram of the panel illustrated in FIGURES 19 and 20;

FIGURE 22 is a plan view of a portion of a solid-state image sensor panel which illustrates another embodiment of this invention;

FIGURE 23 is a cross-sectional view taken along line 23—23 of FIGURE 22; and FIGURE 24 is an equivalent circuit diagram for the panel illustrated in FIGURES 22 and 23.

Figure 1:
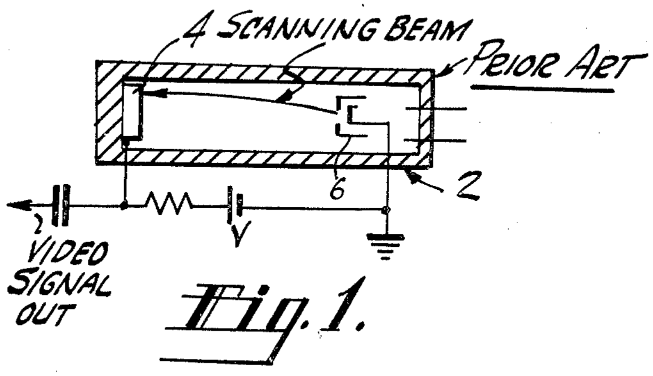
FIGURE 1 is a cross-sectional view of a conventional vidicon tube.
Figure 2:
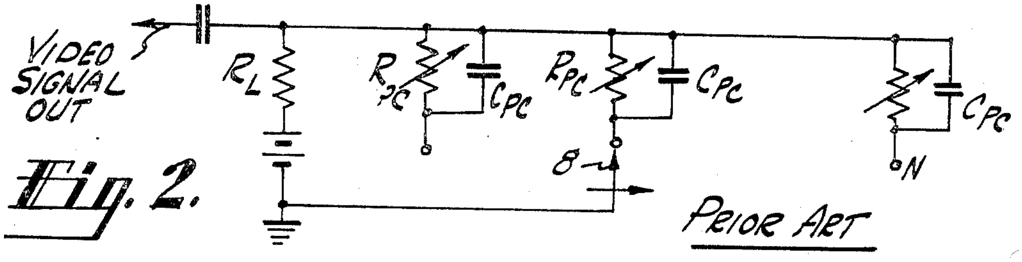
FIGURE 2 is the equivalent circuit diagram for the vidicon tube illustrated in FIGURE 1.

The operation of a solid-state image sensor panel can be compared to that of a conventional vidicon television camera 2 illustrated in FIGURES 1 and 2. A layer 4 of photoconductor material is positioned at one end of the vidicon 2 and forms the target of the vidicon. A photoconductor material has the electrical property of exhibiting a low resistance when illuminated and a high resistance when not illuminated. Consequently, when the vidicon is aimed at an object the resistivity of the various portions of the photoconductor layer 4 is determined by the amount of light reflected thereto from the object. As illustrated in FIGURE 2, the layer 4 is equivalent to an array of independent photoconductor elements, each of which includes a resistance $R_{PC}$ shunted by a capacitance $C_{PC}$. The low velocity scanning beam produced by the electron gun 6 having its cathode at ground potential is illustrated in FIGURE 2 as a commutator switch 8 whose moving arm is tied to ground. The capacitance, $C_{PC}$, is that existing between the two faces of the photoconductor layer 4. The effect of the low velocity scanning beam upon the target is to charge the scanned surface of the photoconductor layer 4 to ground potential.

The video signal is derived from the fluctuating current which flows through the external load resistor $R_L$ as the beam moves across the layer 4 from one photoconductor element to the next. As the beam scans the dark areas of layer 4 the video signal current is very small, and vice versa. The magnitude of the video signal is dependent upon the light and dark areas of the scanned image, thereby providing a video signal which corresponds to the scanned image.

For a solid-state image sensor panel, the vidicon type scanning beam is completely eliminated. An array of solid-state conducting devices which act as switches provide the necessary selective scanning of an image. The "switches" are normally open, and they are closed in sequence for the elemental scan period.

FIGURES 3 and 4 illustrate a lateral-flow solid-state image sensor panel 10 according to one embodiment of this invention. Panel 10 is designed for operation in the "excitation storage" mode which is explained hereinafter. Panel 10 includes an insulator base member 11 which may be substantially rectangular in shape. The base 11 may be composed of any insulator material and preferably one which admits the passage of light therethrough. In the preferred embodiment base 11 is composed of glass.

A plurality of strips 12 of photoconductor material are disposed on one surface of base 11. The strips 12, each of which has a thickness of about 300 A. to 10,000 A. are spaced from each other, and they are substantially parallel to each other. Suitable photoconductor materials for strips 12 include cadmium sulfide, lead sulfide, and cadmium selenide. In the preferred embodiment, the strips 12 are composed of cadmium sulfide.

A conductor strip 14 having a thickness of about 100 A. to 500 A. is disposed on top of each of the photoconductor strips 12 and makes a low impedance ohmic contact therewith. As illustrated in FIGURE 3, a conductor strip 14 is narrower than photoconductor strip 12 and has a longitudinal axis which is parallel to the photoconductor strip 12 on which it (strip 14) is disposed. The conductor strips 14 serve as row (horizontal) conductors. An ohmic contact is one which is conductive for majority carriers in both directions, i.e. is conductive when the row conductor is biased positively and the photoconductor is biased negatively, and is also conductive when the row conductor is biased negatively and the photoconductor is biased positively. As illustrated in FIGURE 4, a row conductor strip does not overlie the edges of the photoconductor strip 12 on which it is disposed. Aluminum or indium are suitable materials for row conductors 14 if the photoconductor strips 12 are either cadmium sulfide or cadmium selenide.

An insulator strip 16 having a thickness of about 5,000 A. to 25,000 A. is disposed completely over each of the row conductor strips 14 and overlaps onto the surface of base 11 in the space between parallel photoconductor strips 12 (FIGURE 4). Insulator materials which are suitable for the strip 16 include silicon monoxide, calcium fluoride, magnesium fluoride, and zinc sulfide. The photoconductor strip 12, the row conductor 14, and the insulator strip 16 extend in the row direction and have longitudinal axis which substantially is parallel, as best illustrated in FIGURE 3.

Figure 5:
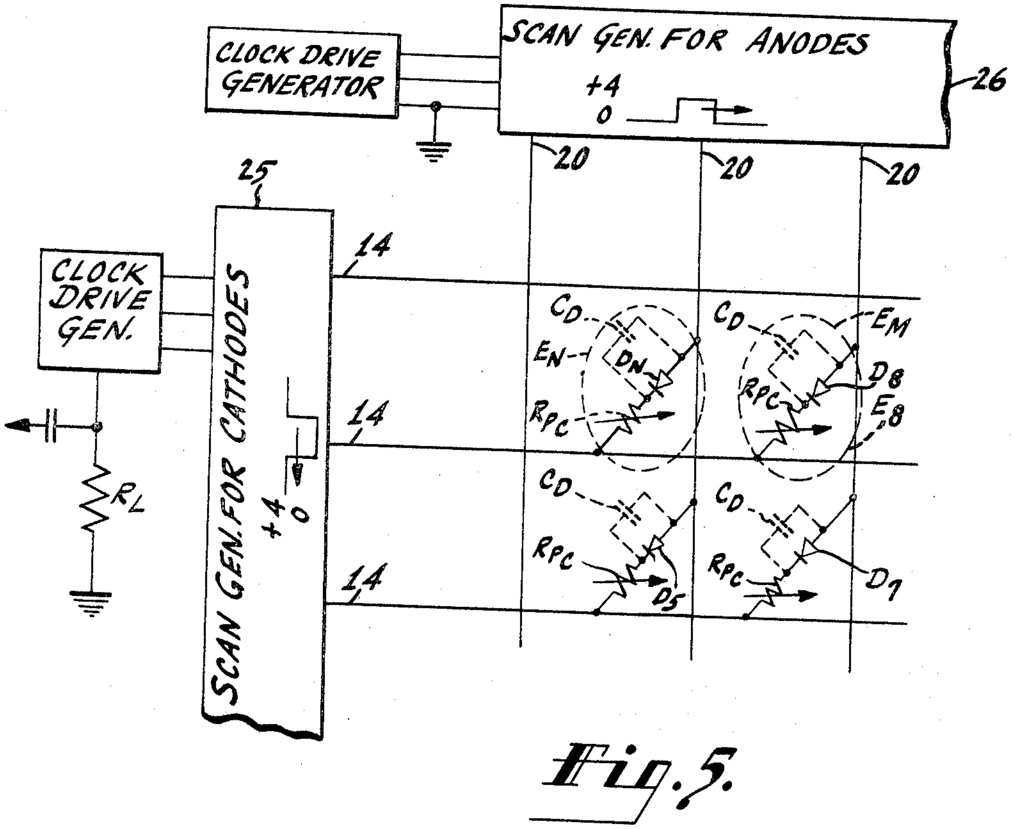
FIGURE 5 is a schematic circuit diagram of the image sensor panel illustrated in FIGS. 3 and 4 connected to scan pulse circuits.

A plurality of substantially parallel blocking strips 18 having a thickness of about 100 A. to 5,000 A. are disposed in a column (vertical) direction, and each of the blocking strips 18 extends across and makes a blocking contact with the photoconductor strip 12 (FIGURE 4). The strip 18 is referred to as a blocking strip, because it does not permit electrons to flow into the photoconductor strip 12 when a negative bias is applied to the strip 18, but strip 18 does accept electrons from the photoconductor strip 12 when a positive bias is applied thereto. At the intersection of individual blocking strips 18 with a photoconductor strip 12 there is formed individual diodes as illustrated in FIGURE 5. Each of the diodes is in series with a photoconductor element which is formed by the resistance of the photoconductor strip 12. A diode, for example, $D_N$, and the photoresistor in series therewith is referred to as a conducting element, $E_N$ as illustrated in FIGURE 5. When the photoconductor strips 12 are composed of either cadmium sulfide or cadmium selenide, suitable blocking materials for blocking strips 18 include tellurium, zinc selenide, and gold. In the preferred embodiment, the blocking strip 18 is tellurium.

A conductor strip 20 having a thickness of about 100 A. to 500 A. is disposed on top of each blocking strip 18 and makes a low impedance ohmic contact therewith. The conductor strip 20, which has a longitudinal axis substantially parallel to blocking strip 18, serves as a column conductor. The conductor strip 20 is narrower than the blocking strip 18 and is positioned on the blocking strip 18 so that it (conductor 20) does not overlie the edges of blocking strip 18 as illustrated in FIIGURE 4. In the preferred embodiment, the conductor strip 20 is gold. The ends of the column conductor strips 20 and the row conductor strips 14 are extended to the top, bottom and side edges of the base member 11 by means of groups of conductive strips 22 and 24, respectively. External circuit connections may be soldered or otherwise connected to the strips 22 and 24, thereby making electrical connection to the row and the column conductors. When a blocking material having good conductivity such as gold is used for the blocking strip 18 it need not be backed by a separate conductor strip 20.

Although the image sensor device 10 illustrated in FIGURES 3 and 4 is an extremely small device, having a dimension of approximately 0.370 inch by 0.370 inch, 180 row conductors and 180 column conductors are provided. Consequently, the image sensor panel 10 includes 32,400 electrical elements each of which includes a photoconductor element in series with a unidirectional device, i.e. a diode. A panel having more or less electrical elements may be provided simply by increasing or decreasing the number of rows and/or columns.

In operation, information to be sensed (not shown) which may be in the form of an image (having light and dark areas) or a punch card having apertures therein, is interposed between a light source (not shown) and the image sensor panel 10. The entire surface of the member to be read is illuminated, and light reflected therefrom strikes the photoconductor elements of the panel. The panel 10 may be oriented so that the light from the image strikes the photoconductor strips 12 from either side thereof, i.e. through the base 11 or from the other side. The intensity of of the light which strikes the photoconductor elements is a function of the light and dark areas of the member which is being read. The resistance of any photoconductor element is dependent upon the intensity of the light which strikes it.

As illustrated in FIGURE 5, during the operation of the image sensor panel 10, a scan pulse from a generator 25 is applied to the row strips 14 which serve as cathodes, and a scan pulse from a generator 26 is applied to the column strips 20 which serve as anodes. A scan pulse having a magnitude of +4 v. is illustrated however, the +4 v. magnitude is not critical. This lack of criticality is true for other embodiments to be disclosed hereinafter. A scan pulse of any magnitude which does not break down the solid state devices within the panel at reverse bias may be used. The scan pulses are applied consecutively to the row and column conductors, 14 and 20, respectively, so that only one of the diodes within the array is forward biased, and therefore conducting at any given time. All of the other diodes have either zero bias or reverse bias, and therefore act as open switches. Alternatively, the sensor panel may be scanned in other ways. For example, all rows may be scanned simultaneously by connecting an output load resistor and amplifier channel to each row.

Figure 6:
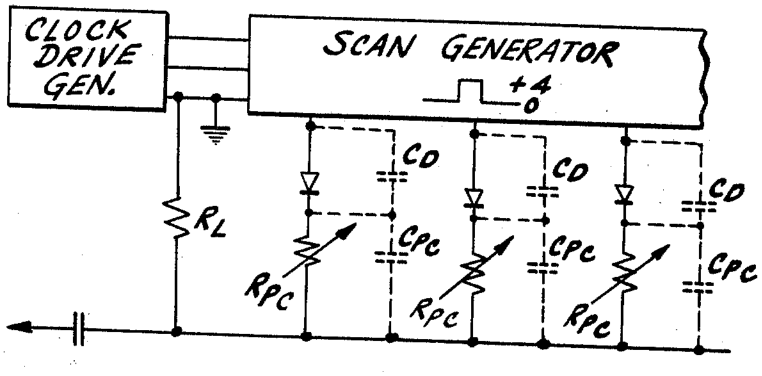
FIGURE 6 is an equivalent circuit diagram illustrating the "excitation storage" mode of operation of the panel illustrated in FIGURES 3 and 4.

As illustrated in FIGURE 6, the capacitance $C_{PC}$ across the photoconductor elements, and the capacitance $C_D$ across the diodes, serve no useful purpose for excitation storage and should be kept as small as possible. The waveform of FIGURE 7*a* illustrates the consecutive scan pulses which are applied to one element $E_N$ (FIGURE 5) causing the diode $D_N$ of that element to be forward biased and therefore momentarily conducting. The waveform of FIGURE 7*c* illustrates the pulsating current output which flows through the load resistor $R_L$. Since the resistance $R_{PC}$ of a photoconductor element in series with the diode $D_N$ varies with the intensity of light which strikes the photoconductor element, the current pulse as illustrated in FIGURE 7*c* which flows through $R_{PC}$ during the moment of scan, i.e. during the interval in which a diode is forward biased, is proportional to the total light flux which has fallen on the photoconductor element in series with the conducting diode during the time immediately preceding the instant of scan as shown in FIGURE 7*b*. This mode of operation is called "excitation storage" because of the excitation effect of the light is temporarily stored in the sensitizing centers of the photoconductor.

The capacitance $C_D$ across the diode, e.g. $D_7$ (FIGURES 5 and 8) of panel 10 is a function of the depletion region 27 within the photoconductor strip 12 beneath the blocking strip (anode) 18. When a depletion region e.g. 29 does not extend completely through the photoconductor strip 12, as illustrated in FIGURE 4, there is an area, A, at the bottom surface of the depletion region 27 which is substantially parallel with the top surface of the strip 12. A difference in potential exists between the top surface of the strip 12 and the porion of strip 12 beneath the bottom surface of the depletion region 27, which portion is conductive. Consequently, there is a capacitance $C_D$ across the diode. The capacitance $C_D$ may be calculated from the following equation:

$$C_D=\frac{KA}{4\pi d}$$

where:

K=dielectric constant of the photoconductor 12.
A=area of the bottom surface of the depletion region within the photoconductor strip 12 which bottom surface is parallel with the top surface of the strip 12.
*d*=the thickness of the depletion region 27.

With larger reverse bias on the diode, the depletion region becomes greater and the capacitance is reduced. FIGURE 8 illustrates the desired condition which occurs when the photoconductor strip 12 of panel 10 is made thin enough for a depletion region 29 to extend completely through the strip at reverse bias. The thickness of the depletion layer may be determined by the following equation:

$$d=\sqrt{\frac{KV}{2\pi N}}\times 2.5\times 10^3 \text{ cm.}$$

where:

K=dielectric constant of the photoconductor strip 12.
V=the sum of the applied voltage and the contact potential, i.e. the voltage potential at the top surface of photoconductor 12.
N=the density of the available charge in the photoconductor (sum of the free and trapped carriers).

The capacitance $C_D$ of a reverse biased diode $D_7$ illustrated in FIGURE 8 is very small because the depletion region 29 extends completely through the strip 12 so that no portion of the strip 12 beneath the region 29 is conducting.

The capacitance $C_D$ of the diode $D_N$ (FIGURE 4) which is forward biased within the panel 10 is insignificant because there is no depletion region formed within the photoconductor layer 12 at forward bias. When $D_N$ is forward biased, the majority carriers, electrons, within the cadmium sulfide layer (which is N type) are attracted towards the anode 20 which is now at a greater voltage than cathode 14. The electrons move from the cathode 14 to the anode 20, which electrodes (14 and 20) make contact with the photoconductor strip 12 in a laterally spaced apart relationship. The conduction between the electrodes is therefore referred to as lateral-flow. The blocking strip 18 composed of tellurium will accept electrons from the photoconductor layer 12 when the device is biased positively. Consequently, an output signal as illustrated in 7*c* is produced. The magnitude of the output signal is dependent upon the resistivity of the photoconductor strip 18 which in turn is dependent upon the intensity of light thereon.

When any diode, e.g. $D_N$ is forward biased, the other diodes within the row in which $D_N$ is located are zero biased. Therefore, it is desirable that the depletion region formed within the photoconductor strip 12 for zero bias extend completely through the strip 12 in the same manner as for reverse bias.

The capacitance $C_{PC}$ for a photoconductor element having spaced electrodes is small in comparison with the capacitance $C_D$, i.e. about 1/10 the value of capacitance $C_D$. When bright light is shown on the panel 10, $C_{PC}$ is substantially shorted out by the increased photoconductivity. Since $C_{PC}$ and $C_D$ are in series, this results in a greatly increased net capacitance of the panel due to $C_D$. However, by forming the photoconductor strip sufficiently thin that the depletion region under the diode extends completely through the photoconductor strip at reverse bias, the capacitance $C_D$ and hence the total panel capacitance is greatly reduced over the value it would have had with a thicker photoconductor.

FIGURES 9 and 10 illustrate a lateral flow solid state image sensor panel 30 comprising another embodiment of this invention. The panel 30 is designed for operation in the "charge storage" mode which is explained hereinafter. Panel 30 includes an insulator base 32 which preferably admits the passage of light therethrough, and an array of islands 34 of photoconductor material disposed on one surface of base 32. Each photoconductor island 34 has a stepped end of reduced thickness (FIGURE 10), thereby providing a major top surface and a step top surface. A plurality of blocking strips 36 are disposed in a row direction and each of the strips 36 extends across and makes a blocking contact with the major top surface of a number of aligned photoconductor islands 34. The strip 36 extends over one edge of the island 34 as illustrated in FIGURE 10. At the intersection of individual blocking rows 36 with a photoconductor island 34 there is formed individual diodes, which are referred to as $D_1$, $D_3$, $D_5$, etc. (FIGURE 11).

A row conductor strip 38 overlies the top of each of the blocking strips 36 and makes a low impedance ohmic contact therewith. A row conductor strip 38 is slightly narrower than the blocking strip 36 and does not overlie the edge of the blocking strip 36. An insulator strip 40 is disposed completely over each of the row conductor strips 38 and overlaps onto a portion of the exposed surface of the photoconductor island 34 (FIGURE 10). The photoconductor islands 34, blocking strip 36, conductor strip 38, and insulator strip 40 have longitudinal axes which are substantially parallel to each other in the row direction.

A plurality of substantially parallel blocking strips 42 are disposed in a column direction across the insulator strip 40. Blocking strip 42 contacts the photoconductor island 32 at the step top surface thereof. At the intersection of the individual blocking strips 42 with an island 34, there is formed individual diodes which are referred to as $D_2$, $D_4$, $D_6$ etc. (FIGURE 10). A column conductor strip 44 which is narrower than the blocking strip 42 is disposed on the blocking strip 42 and makes a low ohmic contact therewith. The column conductor strip 44 does not overlap the edge of the blocking strip 42; consequently, it makes contact only with the blocking strip 42. The ends of the column conductor strips 44 and the row conductor strips 38 are extended to the top, bottom and side edges of the base 32 by means of groups of conductive strips 46 and 48, respectively. External circuit connections may be soldered or otherwise connected to the strips 46 and 48, thereby making electrical connection to the row and column conductors.

The materials and thickness requirements for the various members of panel 30, i.e. base 32, photoconductor islands 34, etc. are the same as the material requirements for corresponding members of panel 10.

Structurally, the image sensor panel 30 differs from the panel 10 in the following respects:

(1) The row conductor strip 38 which serves as the cathode has been greatly increased in size relative to column conductor strip 44 which serves as an anode;

(2) The row conductor strip 38 makes a blocking contact to the photoconductor instead of an ohmic contact; and (3) The photoconductor portions of panel 30 are made up of an array of islands (instead of a plurality of strips) each of which includes a stepped reduced thickness portion beneath the column strip 42 which makes a blocking contact therewith.

During the operation of the panel 30 a scan pulse is applied to the row conductors 38, and a scan pulse is also applied to the column conductors 44. The scan pulses are applied consecutively to the row and column conductors 38 and 44, respectively so that only one of the diodes within the panel 30 is forward biased and therefore conducting at any given time, as illustrated by the equivalent circuit of FIGURE 11 for panel 30.

The blocking contacts made by row strips 36 and column strips 42 with a photoconductor island 34 forms two diodes, e.g. $D_1$ and $D_2$, respectively, back-to-back. As shown in FIGURE 11, a scan pulse of +4 volts is applied to a single column conductor strip 44 and a scan pulse of zero magnitude from a +4 volt level is applied to a single row conductor strip 38. The remaining column conductor strips 44 are at zero potential, and the remaining row conductor strips 38 are at +4 volts potential. The only diode within the assembly which is forward biased is $D_2$ (FIGURE 11). As illustrated in FIGURE 10, with a +4 voltage on column conductor 44, the majority carriers (electrons) within the N type photo-conductor island 34 are attracted in the direction shown by the arrow. The blocking row 42 accepts electrons from the island 34 and conduction occurs. Since the resistance of the diode $D_2$ is very small when $D_2$ is forward biased the voltage potential at point S (FIGURE 11) is very nearly 4 volts. The voltage potential at point S serves to charge the capacitor $C_{PC}$ to a potential equal to the voltage potential at S (4 volts). The portion of photo-conductor island 34 which is conducting, i.e. the portion of island 34 beneath depletion region 43, has a voltage potential of S (i.e. 4 volts) while the voltage potential at conductor 38 is zero. Consequently, a capacitance $C_{PC}$ is developed between the conductor 38 and the portion of photoconductor 34, which capacitance is inversely proportional to the thickness of the depletion region 43 in the photoconductive island 34 beneath the blocking row 36. After the diode $D_2$ has been scanned, i.e. after excitation thereof has been removed, the diode $D_2$ will be either reverse biased or zero biased until it is once again scanned. During the interval between scans the capacitor $C_{PC}$, which was charged at the moment of scan, has a tendency to discharge, i.e. the depletion region 43 begins to dissipate as illustrated by the reduced depletion regions 45 and 46 of diodes $D_3$ and $D_5$ (FIGURES 10 and 12), respectively. The rate of discharge of $C_{PC}$ is proportional to the value of the resistor $R_{PC}$, which varies in proportion to the intensity of light which strikes the photoconductor island 34 (FIGURE 10). For example, if very little light strikes the island 34 during the interval between scans then resistance $R_{PC}$ remains high and the capacitor $C_{PC}$ discharges very little, perhaps from 4 volts to 3.9 volts. Consequently, when the diode $D_2$ is scanned again, the capacitor $C_{PC}$ is charged back to 4 volts. The output signal from $D_2$ at the moment of scan will be very small as illustrated in FIGURE 13*c* because the capacitor $C_{PC}$ has discharged very little during the interval between scans. Conversely, if a large amount of light strikes the photoconductor island 34 between scans, the $R_{PC}$ will be reduced and the capacitor $C_{PC}$ is more greatly discharged. The output current from $D_2$ at the moment of scan is then greater (FIGURE 13*c*). As illustrated in FIGURES 13*b* and 13*c*, the output current for a particular diode, e.g. $D_2$, is directly proportional to the intensity of light which strikes the photoconductor island 34 for a particular conducting element $E_N$ during the interval between scans.

As illustrated by the equivalent circuit of FIGURE 11, each element consists of two diodes back to back with the diode e.g. $D_1$ formed by blocking strip 36 and the major surface of photoconductor island 34 shunted by a capacitor and a photoresistor. The diode e.g. $D_2$ formed by the blocking column 42 and the step top surface of island 34 is also shunted by a capacitor and a photoresistor but due to the smaller area of this diode and the polarity of the applied voltage pulses, its capacitance and photoresistance do not play a significant role in the operating cycle and therefore are not illustrated. The capacitance $C_D$ across the smaller diode $D_2$ is further reduced by making the thickness of the photoconductor island 34 sufficiently thin that the depletion layer within island 34 beneath strip conductor 42 extends completely through the photoconductor island at reverse bias as previously discussed.

When diode $D_8$ is reverse biased, the depletion region 47 which extends completely through the photoconductor pinches off conduction which would otherwise occur. This condition is shown e.g. for diode $D_7$ of FIGURE 12. Since the capacitance $C_{PC}$ across the depletion region which is beneath strip 36 serves a useful purpose in charge storage operation, the photoconductor island beneath blocking strip 36 should be thick enough that the photoconductor portion next to the base 32 remains somewhat conductive at all times, thereby providing a capacitance $C_{PC}$ between the top of the island 34 and the conducting portion beneath the depletion region. Alternatively, this conducting portion might be achieved by the use of semitransparent conducting tabs of metal deposited upon the base 32 of row 36 prior to disposition of the photoconductor.

For charge storage operation, the resistivity for the photoconductor must be sufficiently large that the RC time constant of the conducting element exceeds the period between scans, otherwise the capacitor $C_{PC}$ will be completely discharged long before the moment of scan and the output current is then not a true indication of the total light flux falling upon the photoconductor elements within the panel 30. For charge storage operation the photoconductor and diode characteristics should be such that $$(C_{PC}+C_D)\cdot\frac{R_{PC}\cdot R_{SB}}{R_{PC}+R_{SB}}>t_D$$

where:

$C_{PC}$ is the capacitance across the depletion region underlying the cathode rows $C_D$ is the stray capacitance across the forward biased diode element $R_{PC}$ is the light resistance of the depletion region underlying the cathode rows $R_{SB}$ is the back resistance of the forward biased diode element $t_P$ is the period between successive scans.

In this example, $t_p=t_f$, the so-called "frame time," which is the time between successive scans, during which time all the other elements on the panel are scanned. Under these conditions, the potential at S for an unilluminated element will remain at approximately 4 volts throughout the period between scans. For an illuminated electrode, the voltage at S will be discharged toward zero during this period by an amount dependent upon the total light flux falling upon the photoconductive element.

It is noted that each photoconductive element is responsive to light throughout the entire period between scans, permitting a storage efficiency approaching 100%. The stray capacitance $C_D$ across the forward biased diode should be kept small compared with the storage capacitance $C_{PC}$ across the photoconductor for several reasons: (1) The storage efficiency is degraded by the factor $$\frac{C_{PC}-C_D}{C_{PC}}$$

since the fraction of the total charge which is stored in $C_D$ is discharged internally and does not flow through the external output circuits; (2) The voltage across the photoconductor between scans is lowered by the factor $$\frac{C_{PC}}{C_{PC}+C_D}$$

reducing the sensitivity of the photoconductor; (3) The total capacitance of the output signal lead to ground is given by $$C_T=n\left(\frac{C_{PC}\cdot C_D}{C_{PC}+C_D}\right)$$

where $n$ is the total number of elements connected to the output signal lead at any one time. $C_T$ should be as small as possible for improved signal-to-noise ratio.

With the charge storage outlined above, charge storage should extend over the entire frame period $t_f$, i.e., the capacitor should hold some of its charge until the next scan period, which occurs after all the other elements within the panel have been scanned. However, under some conditions, charge storage for only a line period, $t_L$, may be desired. Charge storage for the line period requires that the capacitor hold its charge only for as long as the period required for scanning one line of elements within the panel. For a panel having 500 lines, $t_L$ is approximately $t_f/500$. Consequently, the RC time constant for line charge storage is 1/500 the RC time constant for charge storage for a frame period $t_f$. The resistance and capacitance conditions for line storage are considerably easier to meet than the frame storage and for this reason line storage may be preferred to frame storage. For the line storage mode, however, it is necessary that each element be prescanned one line period, $t_L$, ahead of the normal discharge scan in order to preset the element for storage.

Otherwise, the photoconductor capacitance $C_{PC}$ is completely discharged before the scanning occurs even in the absence of illumination. For this reason, the prescan does not yield a modulated video signal by charge storage. The prescan technique permits the charge storage period to be continuously adjustable from the entire frame time down to an element time. The most effective storage period can be selected by varying the time interval between the prescan. Such a system would have been very difficult if not impossible with cathode ray beam scanning.

FIGURES 14 and 15 illustrate a transverse flow solid state image sensor panel 50 which comprises another embodiment of this invention. The panel 50 is designed for operation in the "charge storage" mode. Panel 50 includes an insulator base 52 and a plurality of parallel row conductor strips 54 having a thickness of about 100 A. to 500 A. A photoconductor layer 56 about 1,000 A. to 250,000 A. thick covers both the surface of the row strips 54 and the surface of insulator base 52 not covered by conductor strips 54. An array of conductor islands 57 having a thickness of about 100 A. to 500 A. is disposed on the surface of photoconductor layer 56. An island 58 of semiconductor material, in this instance N type cadmium selenide, overlies each conductive island 57. A column 60 of semiconductor material for making a blocking contact with island 58, in this instance P type tellurium, overlies each of the semiconductive islands 58 to form a diode e.g. $D_N$ (FIGURE 15) therewith. The island 58 and column 60 are each about 100 A.–5,000 A. thick. To prevent the column 60 of semiconductor material from making contact with the photoconductor layer 56, an insulator strip 62 which is transverse to column 60 overlies the photoconductor layer 56 and extends between the semiconductor islands 58. A column conductor strip 64 having a thickness of about 100 A.–500 A. overlies each of the semiconductor column strips 60 and makes an ohmic contact therewith.

The equivalent circuit for the panel 50 is illustrated in FIGURE 15. A diode $D_N$ between a column conductor strip 64 and a conductor island 57 is formed at the junction of semiconductor island 58 and semiconductor column 60. The photoconductor layer 56 beneath the conductor island 57 forms a photoconductor element having a resistance $R_{PC}$. A conducting element $E_N$ (FIGURE 15) includes the diode $D_N$ in series with the photoconductor element represented by the resistance $R_{PC}$.

In operation, a scan pulse is applied to the column conductors 64 and row conductors 54, respectively, so that only one diode, $D_N$, within the panel 50 is forward biased and therefore conducting at any given time. A positive pulse (+4 v.) is applied to one of the column conductors 64 while a zero potential is applied to the row conductor 54. The potential at point S (FIGURE 15) is slightly less than the potential (+4 v.) applied to the column conductor 64 (anode). Consequently, the capacitor $C_{PC}$ which is the capacitance between conductor island 57 and conductor row strip 54 is charged to the potential of S. As the scan pulse moves to the next diode within the panel 50, the diode $D_N$ which has just been scanned is either zero biased or reverse biased and therefore acts as an open switch. However, the capacitor $C_{PC}$ remains charged. The capacitor $C_{PC}$ tends to discharge through the resistor $R_{PC}$, and the amount of discharge is proportional to the size of the resistor $R_{PC}$ which varies in proportion to the amount of light striking the layer 56. When the diode $D_N$ is subsequently scanned again, the output current for this diode is large if the capacitor $C_{PC}$ has been greatly discharged during the period between scans and vice versa. The output current, therefore, is a function of the intensity of light which strikes the photoconductor layer 56 during the interval between successive scans.

FIGURES 16 and 17 illustrate a solid state image sensor panel 66 which includes a diode, a thin film transistor (TFT), and a photoconductor at each conducting element $E_N$ (FIGURE 18). Panel 66 is designed for operation in the "excitation storage" mode. Panel 66 includes an insulator base 68 with a layer 70 of photoconductor material thereon. Layer 70 has a thickness of about 300 A.–10,000 A. In the preferred embodiment, N type cadmium sulfide is used for the layer 70.

A plurality of row conductor strips 72 and 74 are disposed on one surface of the photoconductor layer 70. As illustrated in FIGURE 16 the strips 72 and 74 are interdigitated. A suitable material for row strip 72 is tellurium. The row strip 72 makes a blocking contact with the photoconductor layer 70, i.e. strip 72 accepts electrons from layer 70 but does not permit electrons to flow into layer 70. Consequently, a blocking row strip 72 forms a diode $D_N$ (FIGURE 18) with the photoconductor layer 70. The strip 72 has a thickness of about 100 A.–5,000 A. The row strip 74, having a thickness of about 100 A.–500 A. makes a low impedance ohmic contact with the photoconductor layer 70.

A layer 76 of insulator material, for example silicon oxide, covers the row strips 72 and 74 and also the surface of the photoconductor layer 70 which is not covered by the row strips 72 and 74. Layer 76 has a reduced thickness region between strips 72 and 74 (FIGURE 17). The thickness of layer 76 is about 5,000 A.–25,000 A. except for the reduced thickness region which has a thickness of about 300 A.–1,000 A. A plurality of column conductor strips 78, about 100 A.–500 A. thick, overlie the insulator layer 76. A suitable material for the column conductor strips 78 is aluminum. The schematic diagram for the panel 66 is illustrated in FIGURE 18.

A thin film transistor (TFT), illustrated for conducting element $E_N$ (FIGURES 17 and 18) is formed by the portion of photoconductor layer 70 which is between the row strips 72 and 74 for element $E_N$. The column conductor 78 on the insulator layer 76 serves as the gate electrode for the TFT, the conductor strip 74 serves as the cathode, and the blocking strip 72 serves as the anode. Because the column strip 78 serves as the gate electrode, the insulator layer 76 beneath the strip 78 is of reduced thickness in the region between row strip 72 and row blocking strip 74. The photosensitive TFT's are made by the same technique as standard TFT's except that the cadmium sulfide layer 70 is sensitized by heating the layer 70 in the presence of copper doped cadmium sulfide powder at a temperature of about 450° C. for about 45 minutes prior to deposition of the strips 72 and 74.

In operation, the cathodes represented by 74 are placed at a constant voltage, in this instance +2 volts. A scan pulse (+4 v.) is applied to the blocking row strip 72 (anode). A scan pulse (+4 v.) is also applied to the column strip 78 which serves as a gate electrode. As illustrated in FIGURE 18, the diodes within the row B are each forward biased. Current flows, however, from only one of the conducting elements $E_N$, because only element $E_N$ within the row B has a voltage (+4 v.) applied to the gate electrode 78. The effect of the gate potential is to increase the conductivity of the photoconductor layer 70 causing a flow of electrons from electrode 74 to electrode 72 (FIGURE 17) within the element $E_N$. The output current from element $E_N$ is proportional to the value of the resistor $R_{PC}$ which, is proportional to the intensity of light which strikes the photoconductor layer 70 within the conducting element $E_N$. The output current for the panel 66 corresponds to a spatial analysis of an image which is being scanned.

FIGURES 19 and 20 illustrate another solid state image sensor panel 80 which also includes a diode, a thin film transistor (TFT) and a photoconductor at each conducting element $E_N$ (FIGURE 21). Unlike panel 66, previously described, panel 80 is designed for operation in the "charge storage" mode.

Panel 80 includes an insulator base 82 with a layer 83 of photoconductor material thereon. Spaced, parallel insulator row strips 86 are disposed on the surface of layer

83. Conductor row strips 88 overlie pairs of insulator row strips 86 and make ohmic contact with the photoconductor layer 83 at the exposed surface between the insulator row strips 86 (FIGURE 20) of each pair. Blocking row strips 90 are interposed between conductor rows 88 on photoconductor layer 83. Blocking row strips 90 permit electrons to flow from the photoconductor layer 83 but prohibit electron flow into photoconductor 83. Consequently, a blocking row strip 90 forms a diode $D_N$ (FIGURE 21) with the layer 83. An insulator layer 91 covers the conductor row strips 88 and blocking row strips 90 and also covers the surface of photoconductor layer 83 which is exposed. The insulation layer 91 has a reduced thickness portion in the region between insulator strips 86 and blocking strips 90 as illustrated in FIGURE 20. A plurality of spaced, parallel column conductor strips 92 overlie the insulator layer 91. Suitable materials for column conductor strips 92 and row conductor strips 88 are aluminum or gold. Insulator row strips 86 and insulator layer 91 have a thickness of about 5,000 A. to 25,000 A., respectively, except for the reduced thickness portion of layer 91 which has a thickness of about 300 A.–1000 A. Insulator row strips 86 and the insulator layer 91 may be composed of silicon oxide. A suitable material for blocking strip (anode) 90 is tellurium. The thickness of blocking strip 90 is about 100 A.–5000 A. Cadmium sulfide is a suitable material for photoconductor layer 83 and the insulator substrate 82 may be glass. The photoconductor layer 83 is about 300 A.–10,000 A. thick.

A TFT illustrated for conducting element $E_N$ (FIGURE 21) is formed by the photoconductor layer 83 which is between the row strips 88 and row strips 90 for element $E_N$. The column conductor 92 serves as the gate electrode and for that reason the insulator layer between strip 88 (cathode) and strip 92 (anode) has a reduced thickness region.

The equivalent circuit for the image sensor panel 80 is illustrated in FIGURE 21. The row conductor strips 88 are placed at a constant potential, in this instance +2 volts, while a first scan pulse (+4 v.) is applied to blocking row 90 (anode) and a second scan pulse (+4 v.) is applied to column conductor 92 (gate). As illustrated in FIGURE 21, a scan pulse is applied to blocking rows 90 and column conductor 92 so that only those diodes within a single row are forward biased at any given time. As illustrated in FIGURE 21, only those diodes in row B are forward biased. Conduction occurs for an element $E_N$, i.e. conduction between a conductor row strip 88 and a blocking row strip 90, when the potential at strip 90 is +4 (as illustrated in FIGURE 21) and a potential of +4 is simultaneously applied to the column conductor 92. Only one element $E_N$ within the panel is conducting at any given time. The effect of the voltage on conductor 92 (gate) is to increase the conductivity of the photoconductor layer 83 in the region between the row conductor 88 and the blocking anode 90. Because the row conductor strip 88 and the blocking row strip 90 are at different voltage levels, a voltage difference is present between the conductor 88 which overlies insulator strip 86 and the surface of the photoconductor layer 83 beneath the strip 86. A capacitor $C_{PC}$ exists between the conductor strip 88 and the photoconductor layer 83 which are separated by the insulator strip 86. In the period between scans, the capacitance $C_{PC}$ tends to discharge through the resistor $R_{PC}$ which is the resistance of the photoconductor layer 83 within the conducting element $E_N$ (FIGURE 20). The rate of discharge is proportional to the value of the resistor $R_{PC}$ which varies with light.

When the diode $D_N$ (FIGURE 21) is subsequently scanned, the output current which flows through the resistor $R_L$ is directly proportional to the amount of discharge of capacitor $C_{PC}$, during the interval between successive scans. If the photoconductor layer 83 in the area which makes up the photoconductor diode $D_N$ has been exposed to a great amount of light during the period between the scans, $R_{PC}$ is small and the capacitor $C_{PC}$ has been discharged somewhat. Consequently, the output current during the subsequent scan interval will be great. The converse of this example is also true. Therefore, the output current from the panel 80 represents a spatial analysis of the scanned image.

FIGURES 22 and 23 illustrate another embodiment of a solid state image sensor panel 94. Panel 94 includes an insulator base 96 having a plurality of row conductor strips 98 on one surface thereof. The strips 98 are about 100 A.–500 A. thick. The insulator base 96 preferably admits the passage of light therethrough and may be glass. The row conductor strips 98 should preferably be transparent to light. However, conductor strips 98 may be opaque if they are made sufficiently narrow to permit the light to diffuse around them. In the preferred embodiment, row conductors 98 are transparent and are composed of tin oxide. A layer 100 of photoconductor material having a thickness of about 100 A.–5,000 A. overlies the row conductor strips 98 and the surface of base 96 not covered by conductors 98. A suitable material for the photoconductor layer 100 is antimony sulfide. Row conductor strips 98 preferably make a blocking contact with the photoconductor layer 100. A layer 102 of semiconductor material overlies the photoconductor layer 100. A suitable semiconductor material for layer 102 is cadmium sulfide when evaporated onto layer 100 at room temperature. The layer 102 has a thickness of about 100 A.–1,000 A. A layer 104 of semi-insulating material overlies the layer 102. Layer 104 which is about 5,000 A.–50,000 A. thick may be composed of cadmium sulfide when evaporated onto layer 102 at an elevated temperature of about 200° C. A plurality of column conductor strips 106 overlie the layer 104. Column conductor strips 106 make a blocking contact with the semi-insulating layer 104, thereby forming a diode $D_N$ (FIGURE 24). The semi-insulating layer 104 provides the medium for the momentary flow of the space charge current, a flow which is analogous to the scanning beam in a vidicon. Layer 104 should be thick when compared with layer 100 in order that the stray capacitance across layer 104 is much less than the capacitance $C_{PC}$ across the photoconductor layer 100.

The equivalent circuit for panel 94 is illustrated in FIGURE 24. A scan pulse is applied to the column conductors 106 and another scan pulse is applied to the row conductors 98. As illustrated in FIGURE 24, when the potential of +4 volts is applied to conductor 106 while a zero potential is applied to conductor 98, the diode $D_N$, which is formed by the junction of column conductor 106 and layer 104, is forward biased. The potential at point S (FIGURE 24) is slightly less than +4 volts, for example, 3.5 volts. The potential at point S is the potential of the semiconductor layer 102. The potential at point S serves to charge the capacitor $C_{PC}$ (FIGURE 24) to a potential of 3.5 volts with respect to ground. As the scan pulse moves to other elements within the panel 94, the diode $D_N$ (FIGURE 24) has zero potential applied to its anode, i.e. conductor 106. Simultaneously, conductor 98 has a +4 voltage applied thereto. The potential at point S, which was 3.5 volts with respect to the potential of conductor 98, remains at 3.5 volts potential with respect to conductor 98. Consequently, point S is at a potential of 7.5 volts with respect to ground. During this interval between scans, the capacitor $C_{PC}$ tends to discharge through the resistor $R_{PC}$ (FIGURE 24) which is the resistance of photoconductor layer 100. If bright light is shown on the layer 100 during this interval between scans, the resistor $R_{PC}$ is made smaller and the capacitor $C_{PC}$ may discharge to perhaps 1 volt with respect to conductor 98; in which case, point S is at a potential of +5 volts with respect to ground while conductor 98 is still at +4 volts with respect to ground. At the next scan interval, the conductor 98 has a zero potential applied thereto. The capacitor $C_{PC}$ remains charged at +1 volt with respect to conductor 98 which is at zero or ground potential. Therefore, the potential at point S is 1 volt with respect to ground. The scan pulse is now applied to conductor 106 and the +4 volt potenetial again biases the diode $D_N$. The output current which flows through conductor 98 is dependent upon the charge on capacitor $C_{PC}$ at the time of scan. In the given illustration, S will again be elevated to the potential of 3.5 volts with respect to conductor 98 which will recharge the capacitor $C_{PC}$ which begins the cycle over. Since the rate of discharge of capacitor $C_{PC}$ is dependent upon the value of resistor $R_{PC}$, the output current is a function of the intensity of light striking the photoconductor layer 100 during the interval between scans.

What is claimed is:

1. A lateral flow solid state sensor panel comprising
(a) an insulator base,
(b) a plurality of photoconductor regions on said base,
(c) a row conductor strip partially covering the top surface of each of said regions whereby a portion of said top surface is exposed,
(d) a plurality of substantially parallel blocking column strips disposed transversely to said row conductor strip, each of said column strips intersecting said regions at said exposed surface and forming a blocking contact therewith whereby a unilateral conductive device in series with a photoconductor element is formed,
(e) means insulating said row conductor strip from said blocking column strips, and
(f) a column conductor strip on each of said blocking column strips, said column conductor strip making contact only with said blocking column strip.

2. A lateral-flow solid state sensor panel as described in claim 1 further including a row blocking strip interposed between said photoconductor regions and said row conductor, said row blocking strip leaving a portion of said photoconductor region exposed, and forming a second blocking contact with said photoconductor region.

3. A lateral flow solid state sensor panel as described in claim 2 wherein said regions are islands of photoconductor material.

4. A lateral-flow solid state sensor panel as described in claim 1 wherein said photoconductor regions have a thickness sufficiently thin that a normal depletion region which is formed under the blocking contact extends completely through the photoconductor region.

5. A lateral-flow solid state sensor panel as described in claim 2, wherein said photoconductor regions have a thickness sufficiently thin at one end thereof that a depletion region which is formed under said second blocking contact extends completely through the photoconductor region.

6. A solid state image sensor panel comprising,
(a) an insulator base,
(b) a photoconductor layer on said base,
(c) a first group of row conductors on said layer, each of said conductors of said first group making an ohmic contact with said layer,
(d) a second group of row conductors on said layer, said first and second row of conductors being interdigitated each of said conductors of said second group making a blocking contact with said layer thereby forming a diode,
(e) an insulator layer covering said first group and said second group of conductors, and, the surface of said photoconductor layer betwezn adjacent row conductors, and
(f) a plurality of column conductors disposed on said insulator layer.

7. The solid state image sensor panel as described in claim 6 wherein said insulator layer has a reduced thickness portion between adjacent row conductors.

8. A solid state image sensor panel comprising,
(a) an insulator base,
(b) a photoconductor layer on said base,
(c) a plurality of insulator row strips on said layer,
(d) a group of row conductor strips, each of said row conductor strips overlying adjacent pairs of insulator strips and making an ohmic contact with the surface of said layer between said adjacent pairs of insulator strips,
(e) a group of blocking conductor strips, each of said blocking conductor strips being disposed on said photoconductor layer between adjacent row conductor strips,
(f) an insulator layer overlying said row conductor strips, said blocking conductor strips and the surface of said photoconductor layer between said row conductor strips and said blocking conductor strips,
(g) a plurality of column conductor strips disposed on said insulator layer.

9. A solid state image sensor panel as described in claim 8 wherein said insulator layer has a reduced thickness portion in the region between said row conductor strips and said blocking conductor strips.

10. A solid state image sensor panel, comprising:
(a) an insulator base,
(b) a plurality of row conductors disposed on one surface of said base,
(c) a photoconductor layer disposed over said conductors,
(d) a semiconductor layer disposed over said photoconductor layer,
(e) a semi-insulator layer disposed over said semiconductor layer, and
(f) a plurality of column conductors on said insulator layer, each of said column conductors making a blocking contact with said semi-insulator layer, thereby forming a diode.

11. A solid state image sensor panel as described in claim 9 wherein each of said row conductors makes a blocking contact with said photoconductor layer.

12. An image sensor panel comprising:
an insulator base,
means defining a plurality of row conductors on said base,
means defining a plurality of column conductors disposed transversely with respect to said row conductors and insulated therefrom, means defining a photoconductor and a unidirectional conductive device serially coupled thereto at each crossover point between said row and said column conductors, each photoconductor comprising a region having a surface and each unidirectional conductive device comprising a material engaging a portion of said surface and forming a blocking contact therewith.

13. An electrical circuit for processing input signal pulses comprising
a plurality of row conductors and a plurality of column conductors defining a plurality of intersections therebetween,
a plurality of conducting elements, one coupling a row conductor to a column conductor at each of said intersections, each of said conducting elements including a diode and a photoconductor serially coupled to said diode, said photoconductor exhibiting a photoresponsive resistance having a capacitance shunted thereacross, and also exhibiting a time constant greater than the time between said input signal pulses.

References Cited

UNITED STATES PATENTS

| | | | |
|---|---|---|---|
| 2,789,193 | 4/1957 | Anderson. | |
| 2,937,353 | 5/1960 | Wasserman | 250—211 X |
| 3,181,003 | 4/1965 | Sauber | 250—209 X |
| 3,197,648 | 7/1965 | Gasch et al. | 250—209 X |
| 3,309,610 | 3/1967 | Yamamoto | 307—311 X |
| 3,313,939 | 4/1967 | Spencer | 307—311 X |
| 3,378,688 | 4/1968 | Kabell. | |
| 3,011,089 | 11/1961 | Reynolds. | |
| 3,361,931 | 1/1968 | Vollrath | 250—206 X |

OTHER REFERENCES

Coburn, "Biased Photocell Amplifier," IBM Technical Disclosure Bulletin, vol. 10, No. 9, February 1968, p. 1417.

ARCHIE R. BORCHELT, Primary Examiner

C. M. LEEDOM, Assistant Examiner

U.S. Cl. X.R.

250—211, 213, 220; 307—311; 313—108